(12) United States Patent
Jones et al.

(10) Patent No.: US 7,029,172 B2
(45) Date of Patent: Apr. 18, 2006

(54) TEMPERATURE PROFILE DETERMINATION

(75) Inventors: Paul Jones, Jericho (GB); Stephen Richard Duncan, Ashendon (GB); Ronald Daniel, Summertown (GB)

(73) Assignee: Isis Innovation Limited, (GB)

( * ) Notice: Subject to any disclaimer, the term of this patent is extended or adjusted under 35 U.S.C. 154(b) by 0 days.

(21) Appl. No.: 10/481,009

(22) PCT Filed: Jun. 27, 2002

(86) PCT No.: PCT/GB02/02957

§ 371 (c)(1),
(2), (4) Date: Feb. 20, 2004

(87) PCT Pub. No.: WO03/002960

PCT Pub. Date: Jan. 9, 2003

(65) Prior Publication Data

US 2004/0218661 A1    Nov. 4, 2004

(30) Foreign Application Priority Data

Jun. 27, 2001  (GB) ............................ 0115731.2

(51) Int. Cl.
*G01K 1/02* (2006.01)
*G01J 3/06* (2006.01)
*G06K 9/20* (2006.01)

(52) U.S. Cl. .................. 374/137; 374/120; 382/278; 382/300; 382/216

(58) Field of Classification Search ............. 374/120, 374/121, 134, 137; 382/278, 300, 305, 256, 382/115, 128, 190–191, 216, 286; 702/135
See application file for complete search history.

(56) References Cited

U.S. PATENT DOCUMENTS

| | | | |
|---|---|---|---|
| 4,402,009 A | 8/1983 | Rathjens et al. | 358/125 |
| 4,737,917 A * | 4/1988 | Perron | 700/205 |
| 4,786,155 A | 11/1988 | Fantone et al. | 350/516 |
| 4,868,768 A * | 9/1989 | Draggoo et al. | 702/135 |
| 4,989,970 A * | 2/1991 | Campbell et al. | 356/73 |
| 5,689,447 A * | 11/1997 | Ward | 702/99 |
| 5,718,511 A * | 2/1998 | Mundt | 374/137 |
| 6,583,420 B1 * | 6/2003 | Nelson et al. | 250/397 |
| 6,796,144 B1 * | 9/2004 | Shepard et al. | 65/29.11 |
| 6,839,507 B1 * | 1/2005 | Adams et al. | 392/416 |
| 6,847,012 B1 * | 1/2005 | Hauf | 219/390 |
| 6,945,691 B1 * | 9/2005 | Trapasso et al. | 374/15 |
| 2003/0156744 A1 * | 8/2003 | Hashimoto | 382/124 |
| 2003/0215158 A1 * | 11/2003 | Yamada | 382/300 |
| 2004/0151346 A1 * | 8/2004 | Weiss | 382/115 |

* cited by examiner

*Primary Examiner*—Gail Verbitsky
(74) *Attorney, Agent, or Firm*—Waddey & Patterson, P.C.; Emily A. Shouse (57) ABSTRACT

Apparatus for determining the temperature profile of the surface being sprayed or otherwise treated, the apparatus comprising four electric arc spray guns (1) spraying molten steel. The guns (1) are connected to a six-axis industrial robot (2) which is adapted to move them over the surface of the ceramic substrate (3). The metal deposited by the spray builds up a metal shell referred to as the sprayform. The temperature profile of the sprayform surface (3) is recorded periodically by a thermal imaging camera (4) positioned directly above the surface (3). The apparatus includes a pruning filter for receiving each pixel of an image captured by the camera (4) and for applying at least a lower temperature limit to it so as to reject or disregard any pixels determined to have a temperature less than the lower temperature limit.

13 Claims, 10 Drawing Sheets

Diagram of sprayforming process

Flow chart of full temperature profile estimation algorithm.

FIG. 1

Diagram of sprayforming process

FIG. 2

"Shape" of thermal profile from a clear image, note in this case the cold edges and corners with a reasonably uniform hotter central area.

FIG. 3

Thermal image with large areas of obscuration and blurring caused by robot, arc spray guns and gun cables.

FIG. 4

Thermal image from figure 3 after application of a temperature threshold at 120°C. It can be seen that blurring passes through the threshold.

FIG. 5

Partial thermal image after applying a limit to each pixel showing that the blur gets past the limit.

FIG. 6

Partial image with extreme blurring of the cable in the bottom left hand corner. This causes the cable which is approximately at room temperature to appear to be over 120°c.

FIG. 7

"Shape" of thermal profile from a clear image, note in this case the cold edges and corners with a reasonably uniform hotter central area.

FIG. 8

Smoothed thermal profile.

FIG. 9

A 7 by 7 pixel segment from a thermal image at the boundary of an obscured area. The pixels which are rejected by the temperature limits are marked with a cross.

FIG. 10

The 7 by 7 pixel segment from figure 9 showing the application of the pruning filter to a pixel that is accepted, marked with a dashed tick, and a pixel that is rejected, marked with a dashed cross.

FIG. 11

(Partial image as received from thermal imaging camera)

FIG. 12

(Partial image after limiting with U(x,y,t) = 400°C and L(x,y,t) = 120°C. All the blurring remains.)

FIG. 13

(Partial image after limiting with U(x,y,t) = 400°C and L(x,y,t) = ([Normalised Limit (x,y) * Master average(t)] - bound)°C. Note that although most of the blur has been removed there is still a colder blurred edge around some of the extracted areas.)

FIG. 14

(Partial image after limiting with U(x,y,t) = 400°C and L(x,y,t) = ([Normalised Limit (x,y) * Master average(t)] - bound)°C and erosion filtering with a mask size of 7 pixels by 7 pixels. Now all the blurring has been removed.

FIG. 15a

Flow chart of average temperature control algorithm.

FIG. 15b

Graph of average temperature against desired average temperature for the closed loop controller.

FIG. 16

Flow chart of full temperature profile estimation algorithm.

TEMPERATURE PROFILE DETERMINATION

This invention relates to a method and apparatus for determining the temperature profile of a surface and, in particular (but not exclusively) to a method and apparatus for determining the temperature profile of a surface for use in processes involving deposited material (such as, for example, molten metal spraying processes).

WO-A-96/09421 discloses a technique for spraying molten metal (particularly steel) to produce self supporting articles. In the process disclosed it is clear that for a practically realisable process, accurate control of the temperature of the sprayed metal droplets and/or the temperature of the already deposited material is important. It will be appreciated that such considerations are also relevant to spraying of other materials and other deposition processes.

The spray forming process deposits molten metal from electric arc spray guns onto a ceramic substrate to form a metal shell that accurately reproduces the topography of the ceramic. The molten metal is produced in the guns by direct current arcing between two oppositely charged wires made of the metal being sprayed. The arcing causes the wire tips to melt and a high pressure inert gas stream continuous strips molten material from the arc, atomising it into a spray of droplets. The gas stream carries the droplets to the surface of the object where they are deposited. Wire is continuously fed to the arc gun to maintain the flow of sprayed metal and the amount of metal that is deposited can be adjusted by changing the feed rate of the wire. The droplet spray from the guns is scanned over the surface of the ceramic substrate by a robot in a predetermined, repetitive manner, referred to as the "path plan".

The guns act not only as a source of material but also as a source of heat because the molten droplets transfer their heat to the spray formed metal shell as they cool and solidify to build up a solid metal shell. An important feature of the process is that it relies on the metal droplets undergoing prescribed phase transformations as they cool after being deposited on the surface of the sprayform. These phase transformations offset the natural contraction of the metal as it cools, allowing the dimensional accuracy of the sprayform to be maintained. In order to ensure that the required transformations occur, accurate regulation of the thermal history of the sprayed material is necessary. One method of regulating the thermal history is to ensure that the temperature of the surface at the point where the spray was deposited passes through a given temperature at a specific time after deposition. Alternatively, or in addition, it is desirable to control the temperature of the sprayform surface that the incoming droplets will be landing on and to control this temperature, it is necessary to know the temperature profile across the surface during spraying.

A system for regulating the thermal history of the deposited material is proposed in British Patent Application No. 0026868.0 which adjusts one or more parameters including the height, velocity and path of a robot arm (which controls and effects the movement of one or more spray guns) and/or the mass deposition rate, and the orientation of the guns to maintain a given thermal profile over the surface of the sprayform. An essential component of the control system is a system for sensing the thermal profile. Typically, this is a thermal imaging camera which is mounted or otherwise positioned vertically above the sprayform surface during spraying. The camera has a focal plane that is set at the sprayform surface. Any objects in the camera's field of view that are not in the focal plane appear blurred in the resultant image. The camera must be vertically above and pointing normal to the horizontal sprayform surface in order that the surface lies in the focal plane. The camera output is a sequence of thermal images that can be described by $\theta(x, y, t)$ where $\theta$ is pixel temperature, x and y denote pixel position in the image, and t is the time at which the image was captured. However, during the spraying process, the view of the sprayform from the camera is obscured by the robot arm and the cables supplying the wire and gas to the guns. As such, only a partial image of the surface can be observed, which is not always sufficient to accurately control the average temperature of a surface during spraying, and/or to control the temperature profile of a surface (i.e. to make all points on the surface match the required temperature).

Of course, one solution would be to only record the thermal image once the robot arm has moved out of the line of sight of the camera, so that an unobstructed view can be obtained. If the robot arm is moved out of the line of sight of the camera, the guns no longer spray onto the surface of the sprayform. In order to build up the steel shell and maintain the thermal profile, the guns can only be moved off the surface infrequently (typically once per minute).

We have now devised arrangements which overcomes the problems outlined above.

In accordance with a first aspect of the invention, there is provided apparatus for estimating, predicting or determining the temperature profile of a surface being sprayed or otherwise treated, the apparatus comprising at least one thermal image capture device for capturing thermal images of said surface, said surface being sprayed or otherwise treated by means of one or more devices located such that they obscure said thermal images at least at some time during a spraying or treatment process, said apparatus including means for estimating, predicting or determining the temperature profile of obscured portions of said thermal images.

The apparatus preferably comprises a pruning filter means for receiving each pixel of an image captured by said thermal image capturing device and for applying to that pixel at least a lower temperature limit so as to reject or disregard any pixels determined to have a temperature less than said lower temperature limit. In a preferred embodiment, the pruning filter is arranged to apply said lower temperature limit not just to the received pixel but to all of the pixels in a mask around that pixel, such that if any of the pixels in the surrounding mask are determined to fall outside the above-mentioned temperature limit(s), then the particular pixel in question is rejected or disregarded, irrespective of whether its temperature falls within the acceptable range, the apparatus preferably being arranged to estimate, predict or determine the temperature profile of said surface using only the pixels which have not been disregarded or rejected by said pruning filter means.

The first aspect of the invention also extends to a method of estimating, predicting or determining the temperature profile of a surface being sprayed or otherwise treated, the method comprising the steps of capturing one or more thermal images of said surface, said surface being sprayed or otherwise treated by means of one or more devices located such that they obscure said thermal image(s) at least at some time during a spraying or treatment process, determining the temperature profile of portions of said surface in a thermal image not obscured by said one or more devices and estimating or predicting the temperature profile of portion(s) of said surface in a thermal image obscured by said one or more devices, so as to estimate, predict or determine the temperature profile of substantially the whole of said surface.

The method may further comprise the steps of filtering a captured image by receiving each pixel of an image captured by said thermal image capturing device and applying to said pixel (and beneficially all of the pixels in a predetermined mask around it) at least a lower temperature limit thereto so as to reject or disregard any pixels determined to have a temperature less than said lower temperature limit, preferably such that if any of the pixels in the surrounding mask are determined to fall outside the above-mentioned temperature limit(s), then the particular pixel in question is rejected or disregarded, irrespective of whether its temperature falls within the acceptable range.

The apparatus may further comprise means for storing a master image or array comprising temperature information relating to each of a plurality of pixels intended to be representative of an unobscured image of said surface, and means for updating said master image when said image capture device captures a new thermal image of said surface by replacing the stored temperature information with updated temperature information obtained from the new thermal image for each of the pixels not rejected or disregarded by said filter means.

The method may further comprise the steps of storing a master image or array comprising temperature information relating to each of a plurality of pixels representative of an unobscured image of said surface, and updating said master image when said image capture device captures a new thermal image of said surface by replacing the stored temperature information with updated temperature information obtained from the new thermal image for each of the pixels not rejected or disregarded during said filtering step.

In a preferred embodiment of the present invention, the filtering means beneficially applies a lower temperature limit and an upper temperature limit, so as to reject or disregard any pixels determined to have a temperature less than a predetermined lower temperature limit or greater than a predetermined upper temperature limit. In a preferred embodiment, the upper temperature limit is beneficially set at or close to the highest temperature which is acceptable for the surface being sprayed or treated during normal operation. In the case where the present invention is used in sprayforming process in which molten steel is sprayed onto a ceramic substrate, the upper temperature limit may be set at (or around) 400° C. In this case, the temperature range of the sprayform surface is typically between 120° C. and 400° C., so the lower temperature limit may be set at or close to 120° C. However blurring of out of focus obscurations may cause pixels that relate to the obscurations rather than the surface of the sprayform, to appear at greater than 120° C. The lower temperature limit is preferably determined using the equation:

$$([\text{Normalised Limit}(x, y) * \text{Master average}(t)] - \text{bound})° C.$$

where:

Normalised limit is a normalised image array determined by dividing a smoothed, clear thermal image of the surface by its average, or it can be calculated from a model;

x and y are the coordinates of the surface

Master average is the average value of the latest master image (at time t); and

Bound is a constant bound which is simply chosen or determined to ensure that the resultant lower temperature limit results in all invalid pixels of an image being rejected or disregarded.

In a preferred embodiment of the invention, the temperature profile may be predicted by a Kalman filter or the like to which the pixels not rejected or disregarded by the pruning filter are applied.

In a preferred embodiment of the invention, the apparatus beneficially comprises a pruning or erosion filter which operates to apply the above-mentioned temperature limit(s) to a particular pixel in question, but also to all of the pixels in a mask around it. If any of the pixels in the surrounding mask are determined to fall outside of the above-mentioned temperature limit(s), then the particular pixel in question is rejected or disregarded, irrespective of whether its temperature falls within the acceptable range. The size of the mask applied by the erosion filter may be substantially equal to the number of pixels comprising the maximum amount of blurring in a thermal image, which may be determined empirically by examining several partial images with blurred areas, for example.

The average temperature profile at any one time of the surface being sprayed or treated can be determined, in a preferred embodiment of the second aspect of the invention, by obtaining an average of the master image or array at that time, which average can be used as an input to apparatus for controlling the spraying or treatment apparatus. The master image or array average is beneficially low pass filtered prior to input to the control apparatus so as to remove at least some noise therefrom.

In a preferred embodiment of the invention, the apparatus further comprises means for storing information relating to the time(s) (actual or, more preferably, relative) at which temperature information for each of said pixels in said master image or array is updated. Thus, when the temperature information for a particular pixel is updated, the time therefor is reset to zero. Then, each time a new thermal image is captured and that particular pixel is not updated, its time is incremented by one sample time, indicating the 'age' of the temperature information. Means may be provided for obtaining an average value of the information stored in the age storage means, thereby giving a value representative of the accuracy of the average obtained from the master image or array.

Embodiments of the present invention will now be described by way of example only and with reference to the accompanying drawings, in which.

Figure 1:
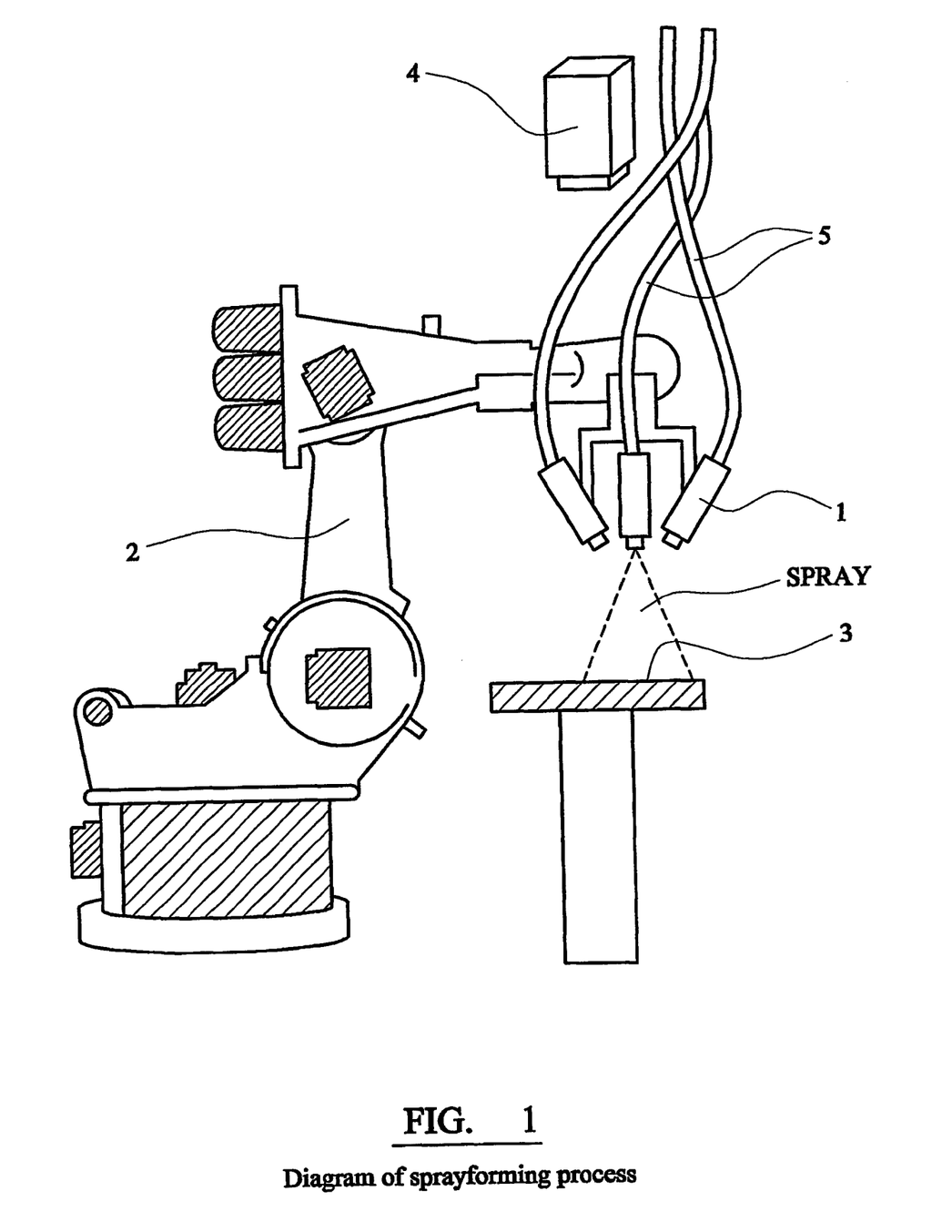
FIG. 1 is a side view of apparatus according to an exemplary embodiment of the present invention.

Referring to FIG. 1 of the drawings, apparatus according to an exemplary embodiment of the present invention comprises four electric arc spray guns 1 spraying molten steel. The guns 1 are connected to a 6-axis industrial robot 2 which is adapted to move them over the surface of a ceramic substrate 3. The metal deposited by the spray builds up a metal shell referred to as the spray form. The temperature profile of the sprayform surface 3 is recorded periodically by a thermal imaging camera 4 positioned directly above the surface 3.

Figure 2:
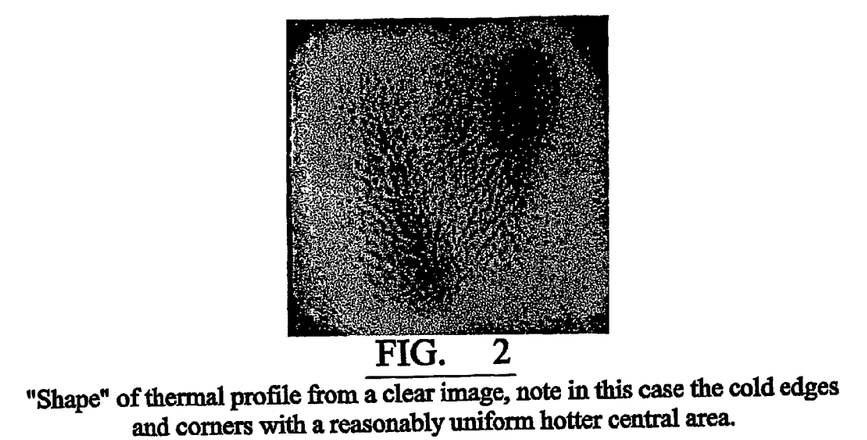
FIG. 2 illustrates the "shape" of the thermal profile from a clear thermal image.
Figure 3:
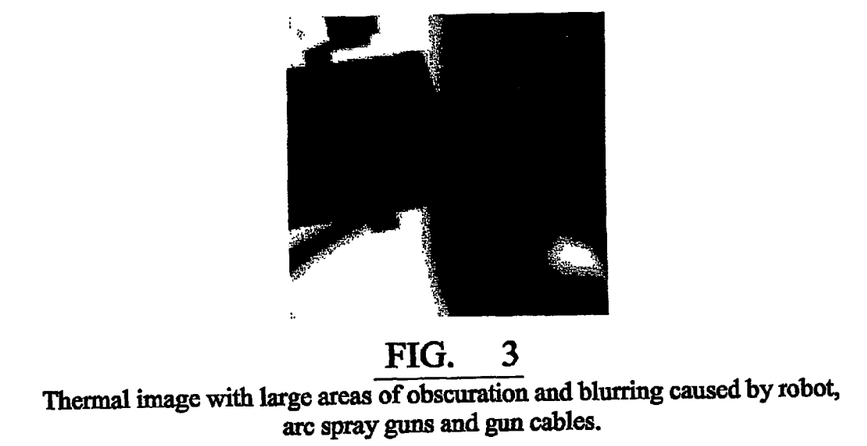
FIG. 3 illustrates a partial thermal image, obscured by robot, spray guns and spray gun cables.

When the field of view of the camera 4 is not obscured by the robot 2, the arc spray guns 1 or their cables 5, the thermal image of the whole sprayform surface 3 can be recorded (and an example of the resultant thermal image is illustrated in FIG. 2 of the drawings). However, when the arc spray guns 1, their cables 5 and/or the robot 2 are positioned between the thermal camera 4 and the sprayform surface 3, at least part of the sprayform surface 3 is obscured relative to the camera's field of view, with the result that large areas of the resultant thermal image may not be representative of the temperature of the sprayform surface 3 (and an example of the resultant image is illustrated in FIG. 3 of the drawings). The thermal image illustrated in FIG. 3 of the drawings can be expressed mathematically by:

$$\theta(x, y, t) = \{\theta_s(x, y, t) \text{ for unobscured pixels}$$
$$\{\theta_o(x, y, t) \text{ for obscured pixels}$$

The size and position of the areas in the image which are obscured vary with time, as the robot 2 and spray guns 1 move across the surface 3 of the sprayform. Although the positioning of the robot 2 and the spray guns 1 is predictable, the position of the cables 5 is not so easily predicted. As a result, it is virtually impossible to determine which pixels in the thermal image will be valid when the image is taken. Further, such a partial image does not contain sufficient information to extract the full surface temperature profile $\theta_s(x, y, t)$ which is required for surface temperature control.

Of course, one method of ensuring that $\theta(x, y, t)=\theta_s(x, y, t)$ is to move the robot 2 and spray guns 1 away from the surface while a thermal image of the sprayform surface 3 is being captured, so as to ensure that there is no obscuration thereof. However, during the time that the spray guns 1 are not over the sprayform surface 3, the sprayed metal is being wasted and the sprayform surface 3 is cooling down, both of which occurrences are clearly undesirable, and limits the frequency with which the guns can be removed from the surface. In any event, the highest allowable frequency is not sufficient to allow satisfactory control purely from clear thermal images.

Referring back to FIG. 1 of the drawings, the thermal imaging camera 4 is focussed on the sprayform surface 3 so that the robot 2, the spray guns 1 and gun cables 5, which are closer to the camera 4 than they are to the sprayform surface 3, are out of focus. This results in an out-of-focus blur appearing in the thermal image at the edge of any obscuration. Without any such blur, an edge transition from an obscured area to an unobscured area takes place abruptly. However, when blurring is present, such an edge transition takes place over several pixels (as shown in FIG. 3 of the drawings).

Figure 4:
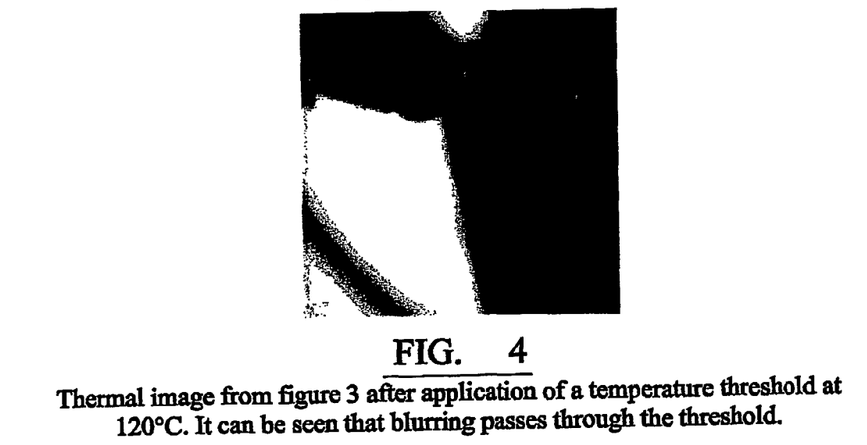
FIG. 4 illustrates a partial thermal image showing a relatively large amount of out-of-focus blurring of the cable in the bottom left.
Figure 5:
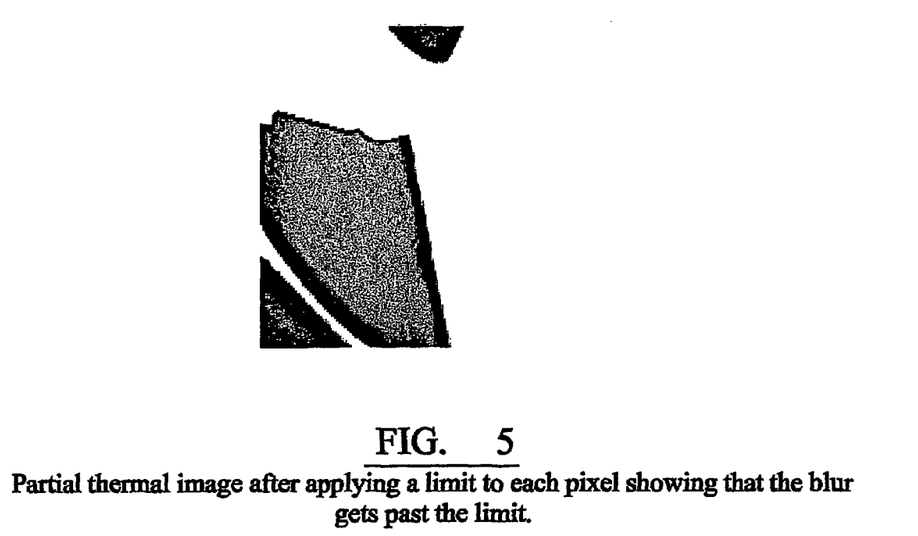
FIG. 5 illustrates a resultant partial thermal image after the image of FIG. 4 has been filtered by applying upper and lower temperature limits thereto.
Figure 6:
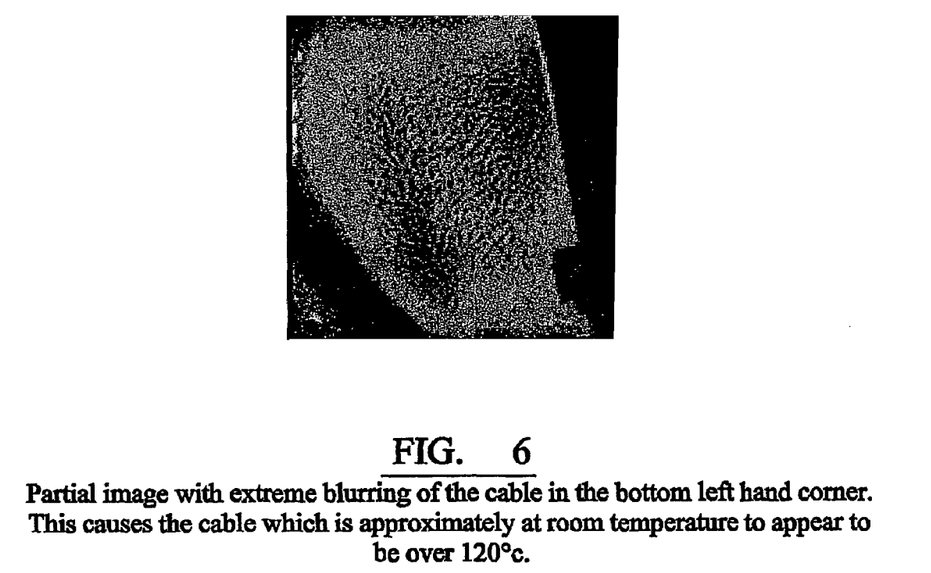
FIG. 6 illustrates a partial image having extreme blurring in the bottom left hand corner.

The amount of blur appearing in a thermal image depends on the distance from the obscuration to the focal plane at the sprayform surface 3. The greater this distance, the more blurring occurs. Such blurring makes it very difficult to determine which pixels in the resultant thermal image are truly representative of the sprayform surface 3. The temperature range of the sprayform surface is typically between 120° C. and 500° C., whereas the temperature of the obscured areas is around room temperature, approximately 25° C. If no blurring is present, a simple temperature threshold can be used to determine whether a pixel in the thermal image is representative of the sprayform surface or an obscured portion thereof, i.e. a threshold filter can be used to reject any pixels which differ by more than a predetermined threshold from their neighbour(s). However, when blurring exists, such a simple threshold filter will accept the blurred pixels, even though they are not representative of the temperature of the sprayform surface, because they do not differ sufficiently from their neighbours within the image (see FIGS. 4 and 5 of the drawings). In extreme cases of blurring, such as that caused by the spray gun cable in the bottom left-hand corner of FIG. 6, the entire area of obscuration is blurred, causing it to appear at a much higher temperature than its true temperature. In this case, a cable which is in fact at approximately room temperature appears to be at over 120° C.

In view of the problems outlined above, it is impossible in conventional arrangements to obtain a continuous measurement of the sprayform surface temperature profile $\theta_s(x, y, t)$. In accordance with a preferred embodiment of the present invention, however, it is possible to obtain an estimate of the temperature profile $\theta_s(x, y, t)$ can be obtained using valid sections of the partial images.

Consider the estimate $\theta_s(x, y, t)$ as a 'master image'. As new partial images are captured and processed, the pixels which are not affected by obscuration or blurring can be extracted and pasted into their equivalent position in the master image. The master image, which is periodically updated, therefore holds the last true surface temperature data received for each pixel. In addition, an 'age array' can be retained for the master image which, for each pixel, holds the time elapsed since the temperature data therefor was last updated. When a pixel is updated with new temperature information from a partial image, the equivalent value in the age array is reset to zero. Every time a pixel is not updated by a partial image, its equivalent value in the age array is incremented by one sample time. Thus, by averaging over the age array, it is possible to generate a value of how old the master image data is on average, which can be used as an indication of how accurately $\theta_s(x, y, t)$ represents $\theta_s(x, y, t)$.

Figure 7:
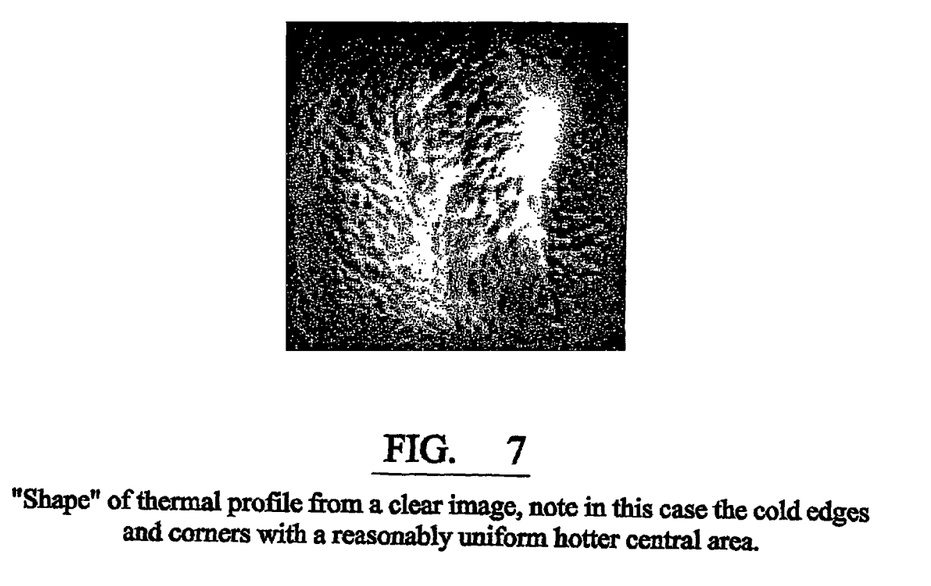
FIG. 7 illustrates the 'shape' of a thermal profile of a surface obtained from a clear image.
Figure 8:
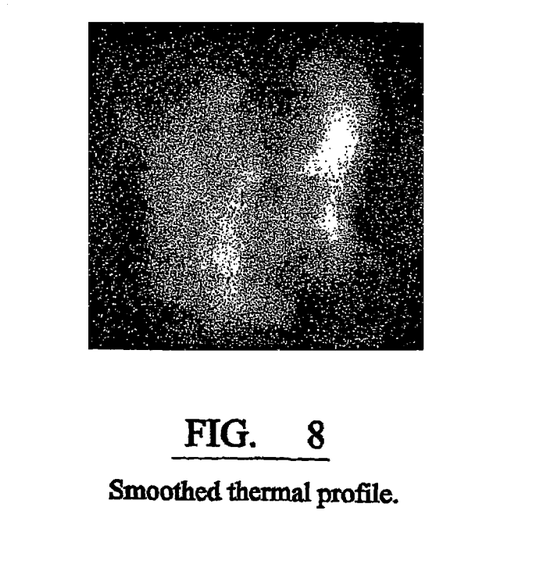
FIG. 8 illustrates a smoothed thermal profile.

In order to reject pixels which are affected by obscuration, it is necessary to determine or define the possible temperature range for each pixel on the sprayform surface. If a pixel in an image lies outside its allowable temperature range, it can be determined to be obscured and, as such, rejected. The sprayform surface temperature varies with position and time, and therefore the allowable pixel temperature ranges must also vary with position and time. The "shape" of the temperature profile can be determined using clear thermal images (see FIG. 7), which temperature profile can be smoothed to remove noise from the image (see FIG. 8).

Using the assumption that the shape of the temperature profile remains constant, and only its amplitude varies as the sprayform surface is heated or cooled, the smoothed clear thermal image can be divided by its average to generate a normalised shape or limit array. In order to determine the lower limit, $L(x, y, t)$, of the allowable temperature range for a pixel, the average of the last temperature profile estimate from the master is multiplied by the normalised shape or limit array value for the given pixel and then a constant bound is subtracted. The upper limit, $U(x, y, t)$, can be determined by adding a constant bound, but because the robot, guns and cables are always lower in temperature than the sprayform surface, a constant upper bound is considered to work just as well. Thus, for example, mathematically we may get:

$U(x, y, t) = 400°$ C.

and, $L(x, y, t) = ([\text{Normalised shape or Limit}(x, y)]^* \text{Master}$
  average (or average of temperature profile estimate($t$)]−bound)° C.

Using knowledge of the shape of the temperature profile and the average of the master image, a lower temperature limit which is a function of position and time can be generated.

Figure 9:
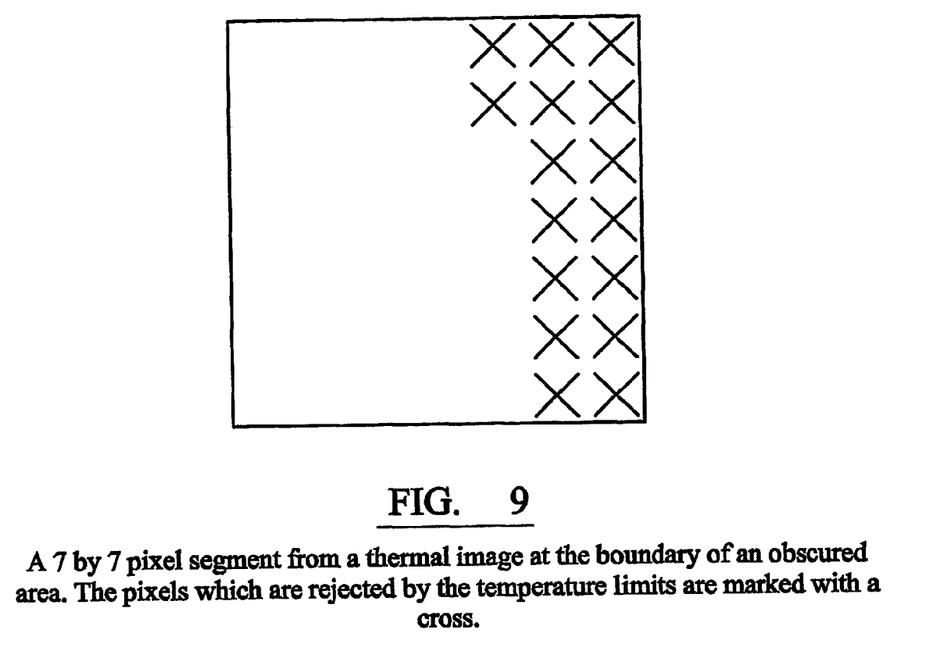
FIG. 9 illustrates a 7×7 pixel segment from a thermal image at the boundary of an obscured area.
Figure 10:
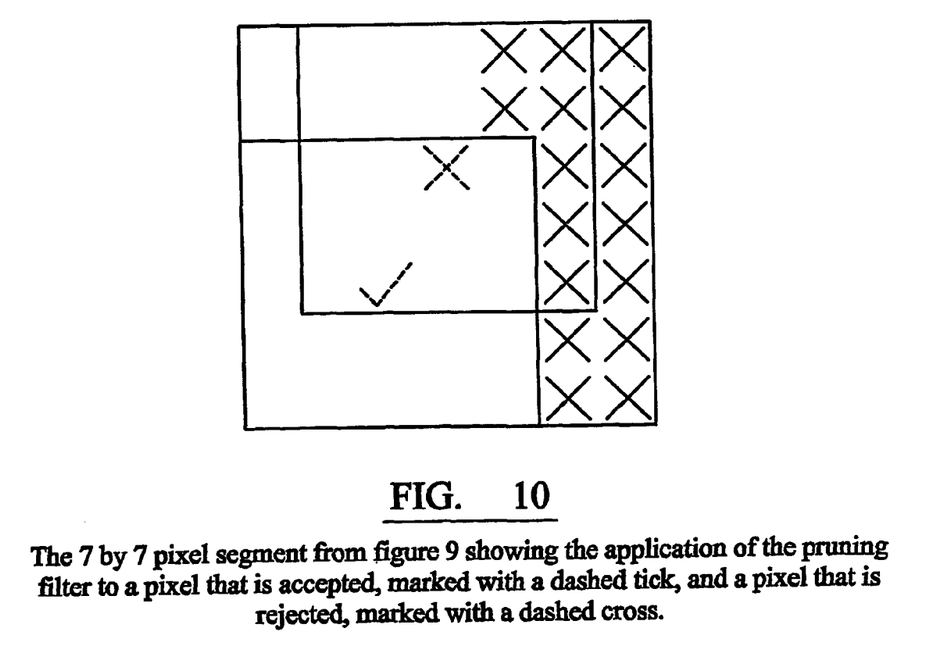
FIG. 10 illustrates the 7×7 pixel segment of FIG. 9 showing the application of a pruning filter to a pixel that is accepted (marked with a dashed tick) and a pixel that is rejected (marked with a dashed cross)

The partial images captured by the thermal camera of the sprayform surface contain areas of sprayform surface pixels, areas of obscured pixels and intermediate areas of blurring in between. Applying the spatially varying temperature limit referred to above removes or disregards the obscured pixels from the image along with at least some of the blurred pixels which are close to the obscured area. FIG. 9 shows a 7×7 pixel segment of an image at the boundary of an obscured area, the pixels removed by the temperature limit being marked with a white cross. However, the blurred pixels which are close to the true sprayform surface pixels still pass through the limit. If these pixels are not dealt with, they will be considered for and entered into the master image, which would severely compromise the accuracy of the estimate. Thus, in order to remove these pixels, a pruning or erosion filter may be used. The pruning filter operates to apply the temperature limit not only to the pixel in question but also to all of the pixels in a mask around it. If any of the pixels in the mask are outside the temperature limit, then the central pixel in question is rejected. However, if all of the pixels in the mask are within the required temperature limit, then the central pixel is accepted into the master image. The application of the pruning filter for two pixels in the 7×7 pixels segment is shown in FIG. 10. The scheme has the effect of rejecting pixels that are near those that fail the limit, cutting away the blurring around a valid region. The size of the mask is chosen to be the same number of pixels as the maximum amount of blurring. The maximum amount of blurring may be found empirically by examining several partial images with blurred areas.

In accordance with a preferred embodiment of an additional or alternative aspect of the present invention, to estimate the surface temperature profile accurately, a thermal model of the system is required. The model is based upon a partial differential equation (PDE) description of the heating effect of the spray guns as they are tracked across the surface of the sprayform. An additional complication is that the nitrogen gas used to propel the molten droplets acts as a source of cooling which must be included in the thermal model. The resulting PDE is $$pcz(t)\frac{\partial \theta(x, y, t)}{\partial t} = Kz(t)\nabla^2 \theta(x, y, t) - H_a\theta(x, y, t) + \quad (4)$$
$$f(x, y, t)u(t)[\theta_g - \theta] + g(x, y, t)[\theta_n - \theta]$$

where,
  p=density of sprayform (Kg m$^{-3}$)
  c=specific heat capacity of sprayform (J Kg$^{-1}$ K$^{-1}$)
  z(t)=thickness of sprayform (m)
  $\theta(x,y,t)$=temperature of sprayform surface (K)
  $H_a$=heat transfer coefficient from sprayform to air (W m$^{-2}$ K$^{-1}$)
  f(x,y,t)=heat flux footprint of guns (J kg m$^{-2}$)
  u(t)=wire feed rate to guns (kg 8$^{-1}$)
  $\theta_g$=temperature of sprayed droplets from guns (K)
  g(x,y,t)=nitrogen cooling footprint from guns (J kg m$^{-2}$)
  $\theta_n$=temperature of nitrogen from guns (K)

A discrete time finite dimensional state space model can be derived from the PDE $$q_{k+1} = A_q k + B_{ku}u_k + D_k + W_k \quad (5)$$

$$y_k = C_k q_k + V_k \quad (6)$$

where $B_k$ represents the time varying heat input from guns $u_k$ is the wire feed rate to the guns, $D_k$ represents the time varying cooling from the guns, $W_k$ is the state noise and $V_k$ is the measurement noise.

Once the obscured and blurred pixels have been removed using the pruning filter algorithm described above, a valid measurement vector, $y_k^v$ remains. This valid measurement vector has variable and unpredictable length dependent on the number of valid pixels in a given image. The measurement equation, ($\partial$), becomes time varying.

$$y_k^v = C_k^v q_k + V_k^v$$

where and are formed by extracting the rows from $C_k$ and $V_k$ which correspond to the valid pixels remaining in $y_k^v$.

Assuming the state and measurement noise models to be independent zero mean white sequences with known, constant covariance matrices then $$E[W_k W_{k'}^T] = Q\delta(k-k') \text{ and } E[V_k V_{k'}^T] = R\delta(k-k').$$

Although the full measurement noise covariance matrix is constant, the actual measurement noise covariance matrix varies with the number and position of the valid pixels in the measurement vector. The result is a time varying covariance matrix The linear minimum variance of error sequential state estimation algorithm with these noise models is the Kalman filter.

The full optimal time varying Kalman filter for the system described gives the algorithm:

Online computation per sample time $$L_k = P_{k|k-1} C_k^{vT} [C_k^v P_{k|k-1} C_k^{vT} + R_k^v]^{-1} \quad (8)$$

$$\hat{q}_{k|k} = \hat{q}_{k|k-1} + L_k [y_k^v - C_k^v \hat{q}_{k|k-1}] \quad (9)$$

$$P_{k|k} = [I - L_k C_k^v] P_{k|k-1} \quad (10)$$

$$\hat{q}_{k+1|k} = A \hat{q}_{k|k} + B_k u_k + D_k \quad (11)$$

$$P_{k+1|k} = A P_{k|k} A^T + Q \quad (12)$$

where $L_k$ is the Kalman gain matrix.

This method uses all of the available measurement data optimally to create an estimate of the state vector.

The Kalman gain update equation involves the inversion of a $N_k \times N_k$ matrix, where $N_k$ is the number of valid pixels at sample time k. In this implementation the thermal images contain 17689 pixels so $0 \leq N_k \leq 17689$. Unless the number of valid pixels is very small for all sample times, this computationally intensive task is infeasible given the constraint of the desired sample time, 0.1 s.

One method of reducing the computational burden of the Kalman filter algorithm is to settle for a sub-optimal time invariant Kalman gain obtained from, $$L = PC^T [CPC^T + R]^{-1} \quad (13)$$

where P is the state error covariance given by the solution to the discrete algebrais Ricatti equation $$APA^T - P - APC^T (CPC^T + R)^{-1} CPA^T + Q = 0 \quad (14)$$

Online computation per sample time $$\hat{q}_{k|k} = \hat{q}_{k|k-1} + L_k^v [y_k^v - C_k^v \hat{q}_{k|k-1}] \quad (15)$$

$$\hat{q}_{k+1|k} = A \hat{q}_{k|k} + B_k u_k + D_k \quad (16)$$

A significant amount of the online computation has been taken offline at the expense of the loss of optimality. This allows the implementation to be run within the constraint of the 0.1 s sample time. The Kalman gain is now optimal only for instances where the measurement vector is complete. If the measurement vector is incomplete, as is nearly always the case, then the Kalman gain will not be optimal, causing inaccurate state estimation.

Another method of reducing the computational burden, without sacrificing optimality, is to use sequential processing of the pixel information in the valid measurement vector [10]. If all of the pixels in the valid measurement vector are used then this method is equivalent to the standard algorithm, but with a superior computational efficiency. A further advantage is that if not all of the valid measurement vector can be used in the sample time then the iteration can be stopped with only a partial loss of information. The equations are, Online computation repeated for each pixel used from measurement vector each sample time $$L_p = P_{p|p-1} C_p^T [C_p P_{p|p-1} C_p^T + R_p]^{-1} \quad (17)$$

$$\hat{q}_{p|p} = \hat{q}_{p|p-1} + L_p [y_p - C_p \hat{q}_{p|p-1}] \quad (18)$$

$$P_{p|p} = [I - L_p C_p] P_{p|p-1} \quad (19)$$

where $y_p$ denotes a single pixel measurement at a location in the image determined by p, $C_p$ is the row of C corresponding to p.

Online computation performed once per sample time $$\hat{q}_{k+1|k} = A \hat{q}_{k|k} + B_k u_k + D_k \quad (20)$$

$$P_{k+1|k} = A P_{k|k} A^T + Q \quad (21)$$

If all of the valid measurement vector is used then the $N_k \times N_k$ matrix inversion of the standard algorithm has been replaced with $N_k$ scalar inversions.

If all of the pixels used in the measurement update are positioned near to the node of a given state, then that state is estimated poorly. Therefore, if the sample time constraint dictates that only part of the valid measurement vector can be processed, the pixels should be used in a random order for the iterative measurement update. This increases the accuracy of the state vector estimate for a given number of pixels.

This observer design is the optimal use of the measurement information given in the processing time constraint.

Figure 16:
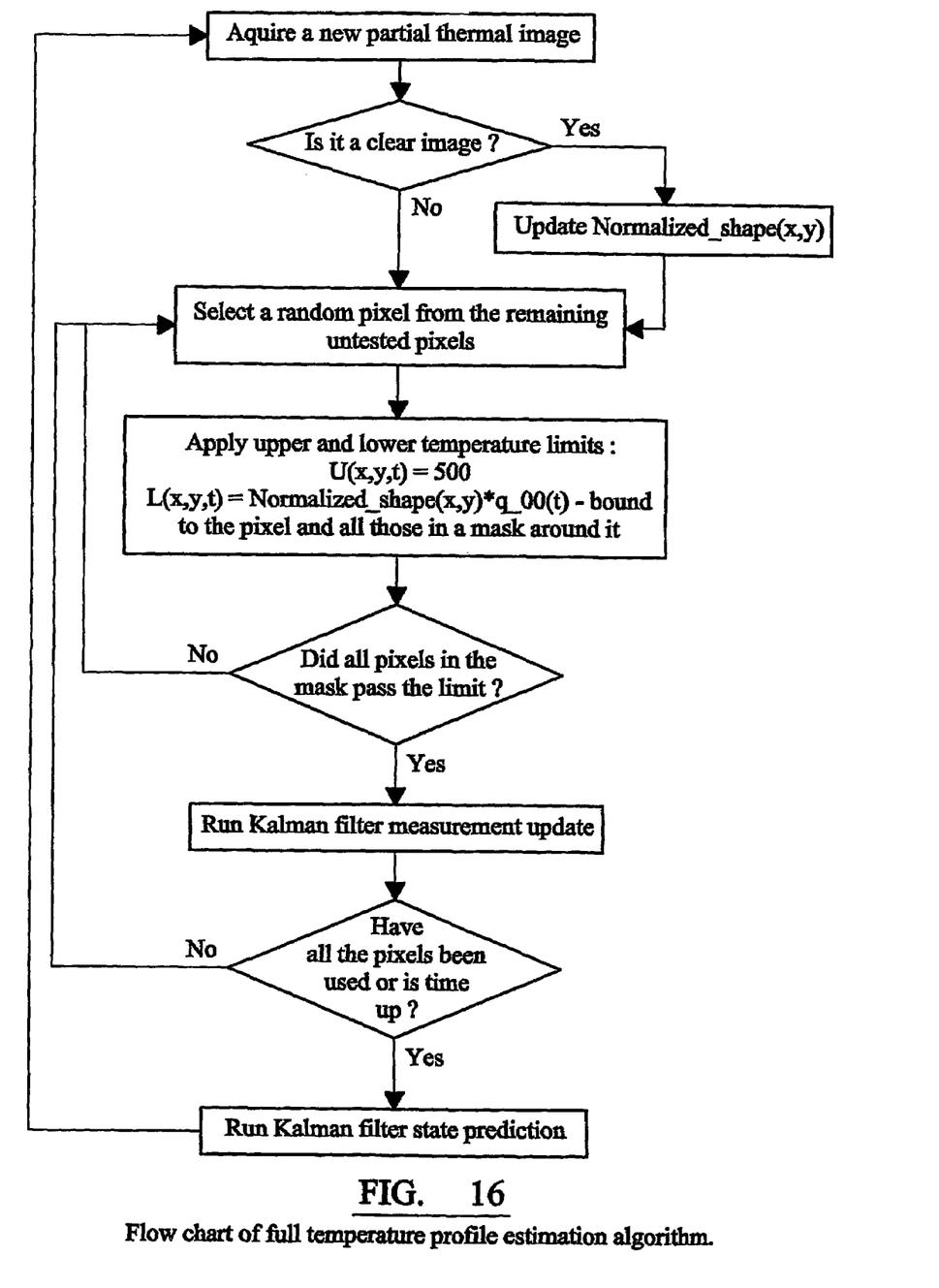
FIG. 16 is a flow diagram illustrating an exemplary embodiment of the method according to a first aspect of the present invention.

The full temperature profile estimation algorithm is shown in FIG. 16:

1. Take a new image, if it is a clear image use it to update the normalized shape (x,y) array.
2. Select a pixel at random from the remaining untested pixels in the image and apply upper and lower temperature limits to the pixel and all pixels in a mask around it. The lower temperature limit is determined by the pixel location and the average temperature estimate, given by the DC mode in the state vector $q_{0,0}$. If they all pass the limits go to 3, else repeat.
3. Use the pixel in the sequential Kalman filter measurement update.
4. If all the pixels have been used or time is up go to 5, else go to 2.
5. Apply the Kalman filter state prediction.
6. Go to 1.

Figure 11:
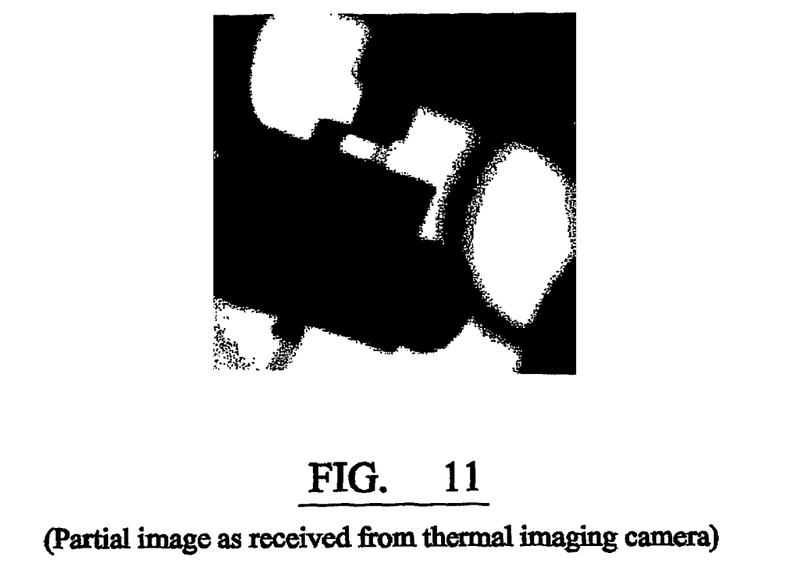
FIG. 11 illustrates a partial thermal image as captured and output from a thermal camera.
Figure 12:
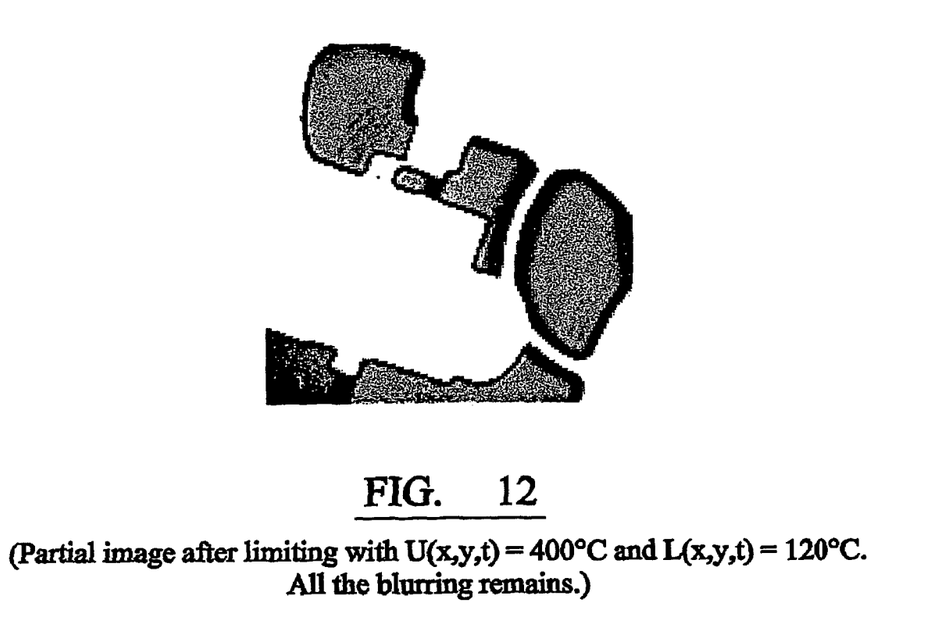
FIG. 12 illustrates the partial thermal image of FIG. 11 after limiting with L(x, y, t)=120° C. and U(x, y, t)=400° C.
Figure 13:
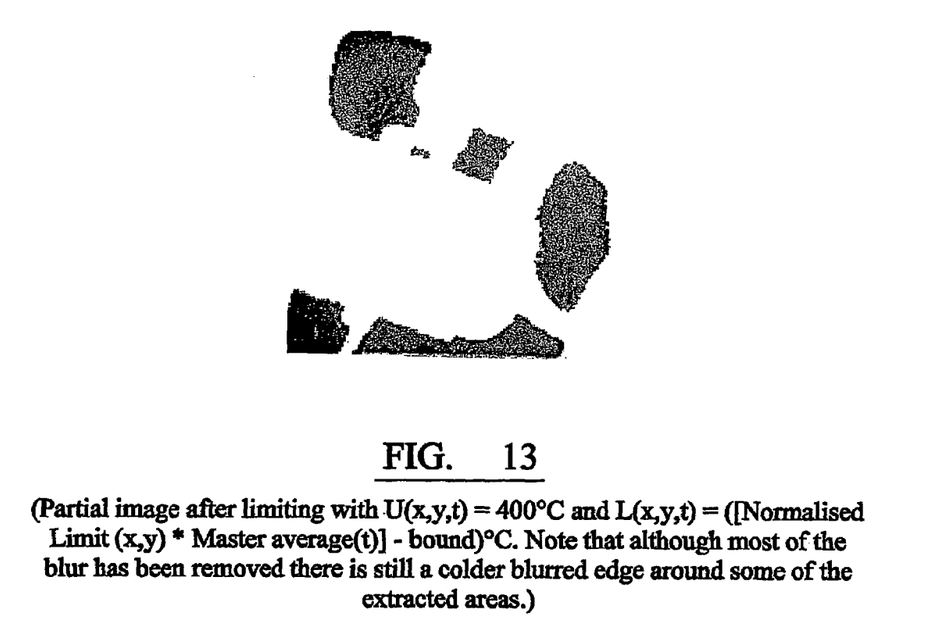
FIG. 13 illustrates the partial thermal image of FIG. 11 after limiting with U(x, y, t)=400° C. and L(x, y, t)= ([Normalised Limit(x, y)*Master average(t)]–bound)° C.
Figure 14:
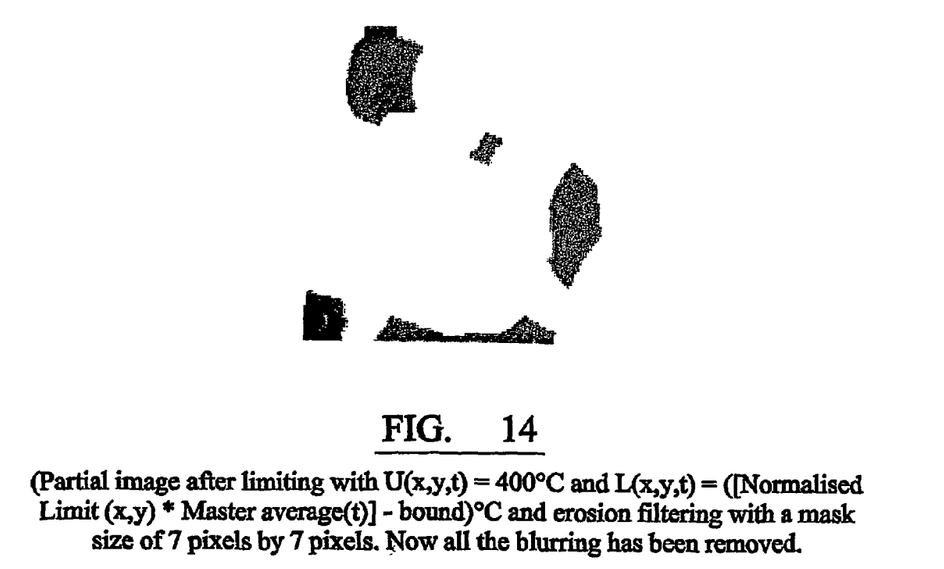
FIG. 14 illustrates the partial thermal image of FIG. 11 after limiting with U(x, y, t)=400° C. and L(x, y, t)= ([Normalised Limit(x, y)*Master average(t)]–bound)° C. and erosion filtering with a mask size of 7 pixels by 7 pixels.
Figure 15A:
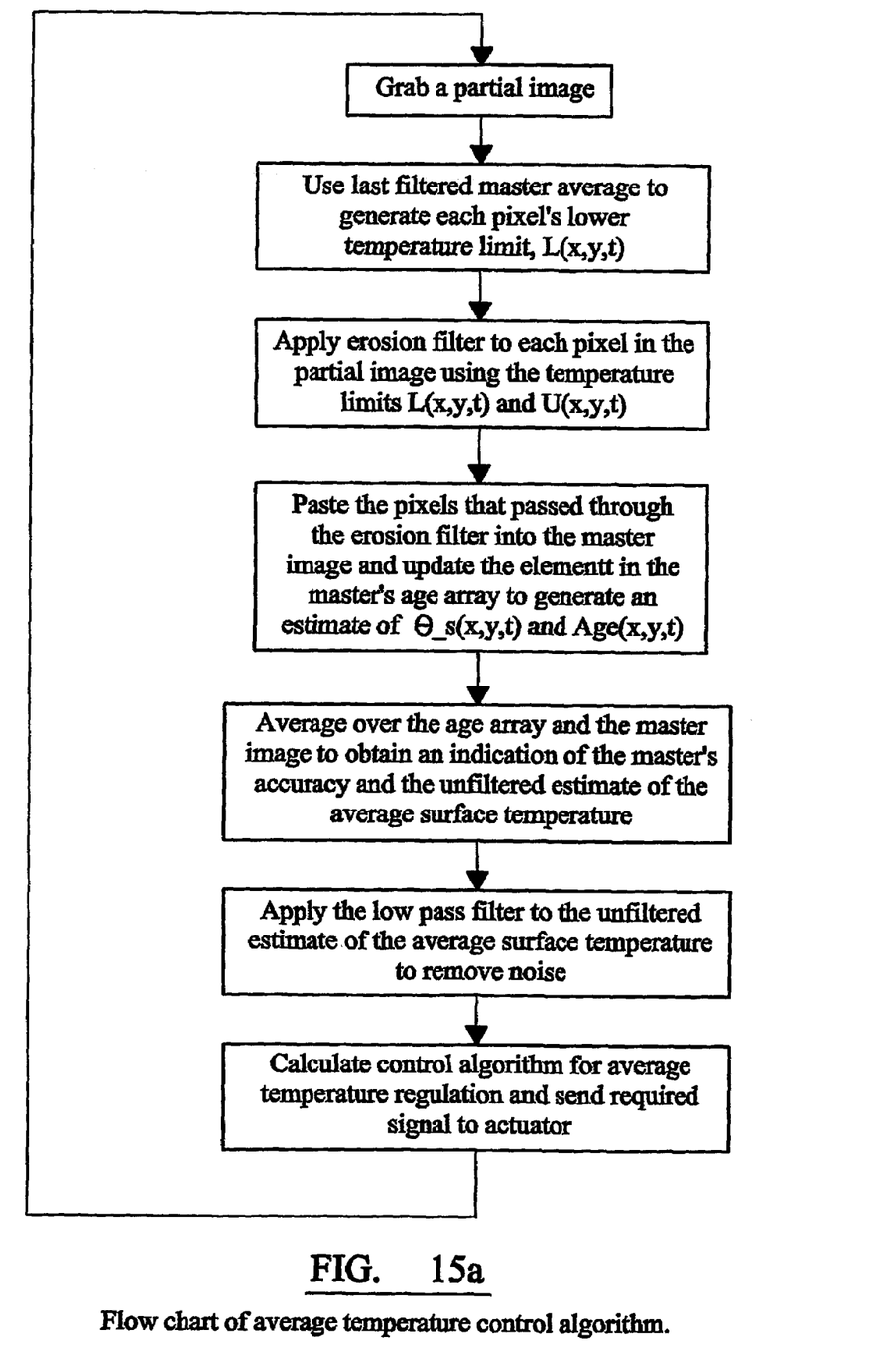
FIG. 15a is a flow diagram illustrating an exemplary embodiment of the method according to a second aspect of the present invention.
Figure 15B:
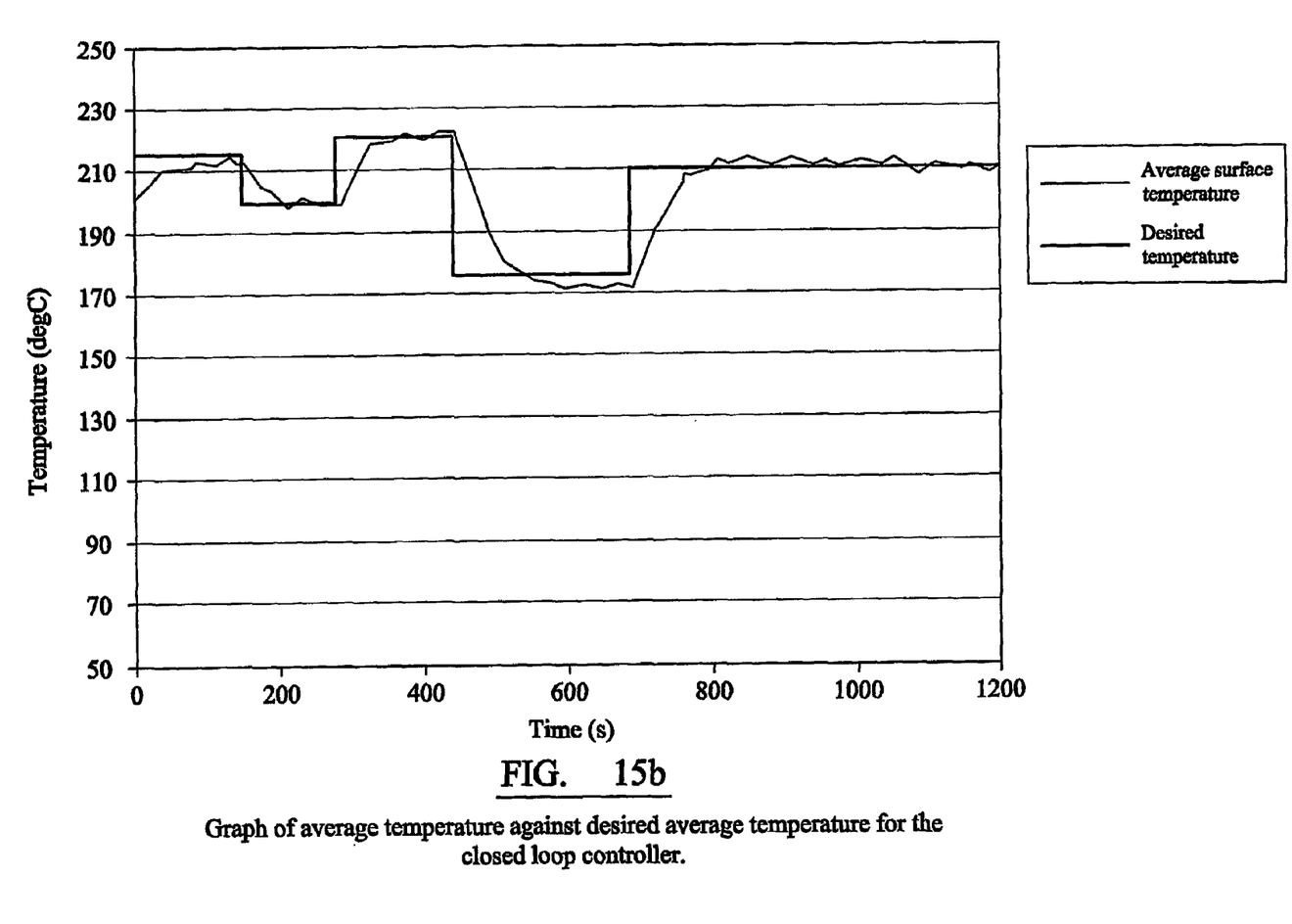
FIG. 15b is a graphical representation of average surface temperature against desired average temperature achieved using apparatus according to an exemplary embodiment of an aspect of the present invention.

FIGS. 12, 13 and 14 illustrate the effectiveness of various types of filtering which can be applied to a partial image, as illustrated in FIG. 11. Thus, FIG. 11 illustrates an original partial image as captured by a thermal imaging camera. FIG. 12 illustrates the resultant partial image after application of the naive or basic temperature limits U(x, y, t)=400° C. and L(x, y, t)=120° C. to each pixel. As shown, although the obscured pixels have been removed, the blurring remains. FIG. 13 illustrates the resultant partial image after application of the temperature limits U(x, y, t)=400° C. and L(x, y, t)=([Normalised Limit(x, y)*Master average(t)]−bound)° C. As shown, this approach removes the obscured pixels and the majority of blurred pixels, although there still exists a colder blurred edge around some of the extracted areas. FIG. 14 illustrates the resultant partial image after application of the full extraction algorithm, which involves using the erosion filter with temperature limits U(x, y, t)=400° C. and L(x, y, t)=([Normalised Limit(x, y)*Master average(t)]−bound)° C., and as shown, the result is the removal of all obscured pixels and all blurring, leaving only the true surface temperature pixels which can then be pasted into the master image(see FIGS. 15a and 15b) and/or used in the Kalman filter (see FIG. 16).

One important use of the surface temperature profile estimate described above is to control the average temperature of the sprayform surface. To achieve this, in accordance with a preferred embodiment of one aspect of the present invention, the master average is used as the input to a control algorithm which uses an actuation mechanism to regulate the average surface temperature. The master average signal contains noise, because each partial image contains a different amount of acceptable information, and this propagates through to the actuators causing excessive wear and tear. In order to prevent this, the master average may be low pass filtered to remove the noise. This approach is effective because the noise exists at higher frequencies than are present in the true average temperature, allowing it to be removed without seriously affecting the performance of the system.

Embodiment of the present invention have been described above by way of example only, and it will be apparent to a person skilled in the art that modifications and variations can be made to the described embodiment without departing from the scope of the invention. It will also be apparent that, while the present invention has been described with reference specifically to a spray forming process in which molten metal is deposited onto a substrate, the present invention would be equally applicable to path planning for other spraying processes, for example, plasma spraying, in which a thermal image is required, typically as part of a control system, but an unobscured thermal image can only be obtained periodically.

The invention claimed is:

1. A method of estimating, predicting or determining the temperature profile of a surface being sprayed or otherwise treated, the method comprising the steps of capturing one or more thermal images of said surface, said surface being sprayed or otherwise treated by means of one or more devices located such that they obscure said thermal image(s) at least at some time during a spraying or treatment process, determining the temperature profile of portions of said surface in a thermal image not obscured by said one or more devices and estimating or predicting the temperature profile of portion(s) of said surface in a thermal image obscured by said one or more devices, so as to estimate, predict or determine the temperature profile of substantially the whole of said surface.

2. A method according to claim 1, including the steps of receiving each pixel of an image captured by said thermal image capturing device and for applying at least a lower temperature limit thereto so as to reject or disregard any pixels determined to have a temperature less than said lower temperature limit.

3. A method according to claim 2, including the steps of receiving each pixel of an image captured by a thermal image capturing device and applying to that pixel and all of the pixels in a mask around it at least a lower temperature limit so as to reject or disregard any pixels determined to have a temperature less than said lower temperature limit.

4. A method according to claim 2, wherein the filtering step comprises the step of applying a lower temperature limit and an upper temperature limit, so as to reject or disregard any pixels determined to have a temperature less than a predetermined lower temperature limit or greater than a predetermined upper temperature limit.

5. A method according to claim 4, wherein the upper temperature limit is set at or close to the highest temperature which is acceptable for the surface being sprayed or treated during normal operation.

6. A method according to claim 4, wherein the lower temperature limit is determined using the equation $$\frac{([\text{Normalised Limit}(x, y)*\text{Master average}(t)]-\text{bound})^\circ}{C}$$

where:

Normalised limit is a normalised image array determined by dividing a smoothed, clear thermal image of the surface by its average, or it can be calculated from a model;

Master average is the average value of the latest master image (at time t); and

Bound is a constant bound which is simply chosen or determined to ensure that the resultant lower temperature limit results in all invalid pixels of an image being rejected or disregarded.

7. A method according to claim 3, wherein the size of the mask is substantially equal to the number of pixels comprising the maximum amount of blurring in a thermal image.

8. A method according to claim 1, comprising predicting the temperature profile at any one time of the surface being sprayed or treated by applying the pixels not rejected or disregarded during said filtering step to a Kalman filter.

9. A method according to claim 1, including the steps of storing a master image or array comprising temperature information relating to each of a plurality of pixels representative of an unobscured image of said surface, and updating said master image when said image capture device captures a new thermal image of said surface by replacing the stored temperature information with updated temperature information.

10. A method according to claim 9, comprising determining the average temperature profile at any one time of the surface being sprayed or treated by obtaining an average of the master image or array at that time.

11. A method according to claim 10, comprising using said average as an input to apparatus for controlling the spraying of treatment apparatus.

12. A method according to claim 11, wherein said master image or array average is low pass filtered prior to input to the control apparatus so as to remove at least some noise therefrom.

13. A method according to claim 9, comprising storing information relating to the time(s) (actual or, more preferably, relative) at which temperature information for each of said pixels in said master image or array is updated.

* * * * *